United States Patent [19]

Davies et al.

[11] 4,057,436

[45] Nov. 8, 1977

[54] DISPERSION OF SOLIDS IN ORGANIC SOLVENTS

[75] Inventors: Peter Kingsley Davies; Leslie Richard Rogers; James Frederick Stansfield; Arthur Topham, all of Manchester, England

[73] Assignee: Imperial Chemical Industries Limited, London, England

[21] Appl. No.: 613,557

[22] Filed: Sept. 15, 1975

[30] Foreign Application Priority Data

Aug. 1, 1975 United Kingdom ............... 32287/75
Sept. 17, 1974 United Kingdom ............... 40416/75
Sept. 17, 1974 United Kingdom ............... 40418/75

[51] Int. Cl.² ............................................. C08K 5/34
[52] U.S. Cl. ............................ 106/288 Q; 106/308 N
[58] Field of Search ................. 106/288 Q, 308 N, 22

[56] References Cited

U.S. PATENT DOCUMENTS

| | | | |
|---|---|---|---|
| 3,446,569 | 5/1969 | Braun et al. | 106/308 N |
| 3,754,958 | 8/1973 | Giambalvo | 106/308 N |
| 3,764,360 | 10/1973 | Langley | 106/288 Q |
| 3,891,455 | 6/1975 | Langley et al. | 106/308 N |

FOREIGN PATENT DOCUMENTS

| | | | |
|---|---|---|---|
| 1,313,147 | 4/1973 | United Kingdom | 106/288 Q |
| 1,356,253 | 6/1974 | United Kingdom | 106/288 Q |
| 1,356,254 | 6/1974 | United Kingdom | 106/288 Q |
| 1,376,247 | 12/1974 | United Kingdom | 106/288 Q |
| 1,393,623 | 5/1975 | United Kingdom | 106/288 Q |

*Primary Examiner*—Winston A. Douglas
*Assistant Examiner*—J. V. Howard
*Attorney, Agent, or Firm*—Cushman, Darby and Cushman

[57] ABSTRACT

This invention is concerned with dispersions of solids in organic liquids containing polymeric or resinous dispersing agents. The fluidity of such dispersions is greatly improved by the presence in the dispersions of a substituted ammonium salt of a colored acid wherein there are between 16 and 60 carbon atoms contained in at least 3 chains attached to the N-atom of the substituted ammonium ion. The dispersions are particularly useful for the preparation of ink and paints.

3 Claims, No Drawings

DISPERSION OF SOLIDS IN ORGANIC SOLVENTS

This application relates to dispersions of solids, particularly dyestuffs and pigments, in organic liquids in the presence of dispersing agents.

Traditionally it has been the practice in the ink and paint manufacturing industries for the ink or paint manufacturer to purchase the colouring matter for the ink from pigment manufacturers in the dry state and in the case of certain important pigments in a semi-prepared so called 'pigmentary' form in which the fine particles of colour (normally below 1 micron) are considerably re-aggregated so that further grinding is necessary, in order to break down the aggregates, during formulation of the ink. In such circumstances both the pigment and the ink manufacturer often need grinding equipment and it is also necessary at some stage to handle dry finely divided pigment with all the environmental problems that such an operation involves.

Recently there has been a move on the part of certain pigment manufacturers to overcome these disadvantages by supplying the ink manufacturers with a concentrated dispersion of pigment in a suitable organic solvent which the ink or paint manufacturers simply mixes with the other ink or paint ingredients such as binders, thickeners, resins etc. This move reduced the demand on the ink or paint manufacturer's milling equipment and avoided the need for the handling of finely ground dry colour.

Such a move posed severe technical problems in that there was a need to provide highly concentrated (up to 40%) dispersions of the pigment in the organic solvent to allow for dilution during ink formation. Another problem sometimes to be overcome was the previous requirement for an expensive salt milling or acid precipitation stage prior to a fine milling which still involved the handling by the pigment manufacturer of dry colour. New ranges of dispersing agents were however developed which permitted the production of stable deflocculated dispersions direct from crude pigment thus considerably reducing the cost and easing the production of pigments in a finely dispersed form.

Although severe technical problems were overcome the new dispersions were often very thick and therefore difficult to handle and also to dilute for formulation of the inks and paints. Similar defects are often experienced when many of the conventional dispersing agents used in the paint and ink industries, e.g. alkyd resins and polymers, are used to form dispersions of solids in organic liquids especially when the concentration of the dispersed solid is high.

We have now found surprisingly that dispersions of greatly increased fluidity can be produced by the addition, to the suspension of solid and dispersing agent in the solvent, before grinding, of certain salts as hereinafter defined formed by the reaction between amines or quaternary ammonium salts and coloured acids.

According to the present invention we provide a composition of matter comprising i. a finely divided solid having an average particle size of less than 20 microns
ii. a polymeric or resinous dispersing agent
iii. a fluidising agent which is a substituted ammonium salt of a coloured acid wherein there are between 16 and 60 carbon atoms contained in at least 3 chains attached to the N atom of the substituted ammonium ion, and
iv. an organic liquid The finely divided solid for which the preferred average particle size is below 10 microns and more especially still below 1 micron is preferably a dye or pigment which is substantially insoluble in the organic liquid.

The dispersing agent may be any of those used conventionally in the preparation of dispersions of pigments, dyestuffs and other solids in organic liquids and especially those used in the manufacture of inks and paints. The preferred dispersing agents are those developed for the preparation of concentrated non aqueous dispersions of pigments and dyestuffs directly from crude colour.

The fluidising agents preferably contain at least four organic chains attached to the nitrogen atom of each substituted ammonium ion and these chains preferably contain, in total, at least 19 carbon atoms, and more especially between 25 and 40 carbon atoms. It is further preferred that at least one and more preferably two of the chains are alkyl or alkenyl groups containing at least 8 and preferably at least 12 carbon atoms especially those groups containing between 12 and 30 carbon atoms.

The coloured acid may be any pigment or dyestuff which contains an acidic grouping and if desired can be the solid that is to be dispersed, where that solid already contains an acidic grouping or where the solid to be dispersed does not contain an acidic grouping, can be that solid which has been modified by the incorporation of one or more acidic groups. However it is preferred that the coloured acids are compounds of the azo, anthraquinone or phthalocyanine series which contain acid radicals such as —SO$_3$H and —COOH which will react with amines or with quaternary ammonium salts to form substituted ammonium salts of the coloured acid.

It is preferred that the coloured acids are polycyclic aromatics especially of the phthalocyanine series and in particular the mono- and di-sulphonic acids of copper phthalocyanine or mixtures of these.

Whilst many of the fluidising agents may be fairly soluble in the organic liquid it is not essential that they are more than sparingly soluble and in fact sparingly soluble fluidising agents are preferred since they have a reduced tendency to bleed.

The fluidising agents may be prepared by any of the conventional methods for preparing such salts such as by neutralising the coloured free acid with the appropriate amine or substituted ammonium hydroxide or by reaction of the alkali metal salt of the coloured acid with the appropriate substituted halide. While the two reactants may be mixed in stoichiometric proportions this is not essential for the purpose of the invention and good results can be obtained with excess of either the amine, the substituted ammonium salt of the coloured acid (or its alkali metal salt).

The organic liquid may be any in which the solid to be dispersed is substantially insoluble although it is preferred to use liquid aromatic hydrocarbons or liquid aliphatic or aromatic chlorinated hydrocarbons.

The composition of this invention can be obtained by any of the conventional and well known methods of preparing dispersions. Thus the solid, the organic liquid, the fluidising agent and the dispersing agent may be mixed in any order and the mixture then subjected to a mechanical treatment to reduce the particle size of the solid, for example by ball milling, bead milling or gravel milling until the dispersion is formed, in which the particle size of the solid is less than 10 microns and preferably less than 1 micron.

Alternatively, where the dispersing agent and the fluidising agent are completely soluble in the organic liquid, the solid can be treated to reduce its particle size independently or in admixture with either the organic liquid or either or both of the dispersing and fluidising agents, and the other ingredient or ingredients then added following which dispersion can be obtained by stirring the mixture.

Compositions obtained in this way and comprising the solid in finely divided form and the dispersing and fluidising agents are a further feature of the invention.

The amount of the dispersing agent is such as corresponds to between 5% and 100% by weight and the amount of the fluidising agent is such as corresponds to between 1% and 50% by weight based on the weight of the solid, the preferred ranges being between 10% and 30% and 5% and 15% respectively. The composition preferably contains between 5% and 70% by weight of the solid based on the total weight of the composition.

As examples of the solids which may be used to form the composition of this invention there may be mentioned organic pigments of the azo, anthraquinone, thioindigo, anthanthrone, isobenzanthrone, indanthrone and triphendioxazine series, quinacridone pigments, lakes and toners of acidic, basic and mordant dyestuffs and especially phthalocyanine pigments such as copper phthalocyanine and its nuclear halogenated and phenylated derivatives; inorganic pigments such as the oxides of iron, lead, zinc and titanium, the chrome pigments including the chromates of lead, zinc, barium and calcium and the various mixtures and modifications thereof such as are commercially available as greenish-yellow to red pigments under the name primrose, lemon, middle, orange, scarlet and red chrome, Prussian blue, cadmium sulphide, vermillion, ultramarine and in particular carbon black.

Such pigments are described in for example, the 3rd Edition of the Colour Index, which was published in 1971, under the heading 'Pigments' and in subsequent authorised amendments thereto. Where the solid is β-form copper phthalocyanine it may be the normal 'pigmentary' form of copper phthalocyanine or it may be crude copper phthalocyanine.

As further examples of the solids that may be dispersed in the composition of the invention there may be mentioned any of the recognised classes of dyestuff such as are described in for example the 3rd Edition of the Colour Index provided they are substantially insoluble in the organic liquid. A preferred class of dyestuffs comprises Disperse Dyestuffs, the resulting compositions being of value for the production of printed paper which is to be used in the process of transfer colour printing. When the solid to be dispersed is a pigment from the azo series it is preferred that the fluidising agent is formed by reaction of a coloured acid with a quaternary ammonium slat.

As examples of the dispersing agents that may be employed in the compositions of this invention there may be mentioned the dispersing agents that are described in U.K. Patent Specifications Nos. 1,393,401, 1,373,660, 1,313,745, U.K. Patent Application No. 39428/73, U.S. Pat. Nos. 3,741,941, 3,788,996, 3,704,255, 3,817,944 and 3,654,771, and in German Patent Application No. 2,350,454, acrylate and methacrylate polymers and copolymers, alkyd resins, polyester resins, modified alkyd resins, urethanes, urethane oils, tars and pitches such as gilsonite as used in the preparation of newsprint inks. U.K. 1,393,401 describes and claims compositions of matter comprising a finely divided dispersion of a solid in an organic liquid containing dissolved therein a dispersing agent which is an adduct of one or more compounds from each of the following classes:

a. an organic compound containing two or more isocyanate groups, b. an organic compound containing two or more groups which are reactive with isocyanate groups, and c. a compound of the formula:

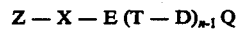

wherein

Z represents —OH or —NHR, wherein R is a monovalent hydrocarbon radical;

X is an optionally substituted divalent hydrocarbon radical;

T is a divalent hydrocarbon radical;

$n$ is a positive integer;

Q is an optionally substituted monovalent hydrocarbon radical; and

E is a

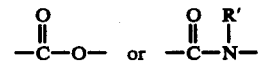

group wherein R' is a hydrogen atom or a monovalent hydrocarbon radical, and D is a

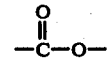

group provided that only one of E and D is connected to T via the carbon atom of the carbonyl group present in D and E, and at least one of the groups represented by X, T, Q, R and R' contains a carbon chain having at least five carbon atoms.

U.K. Pat. No. 1373660 describes and claims dispersing agents of the formula:

wherein Z is a divalent bridging group which is attached to the carbonyl group through an oxygen or nitrogen atom, R is a primary, secondary or tertiary amino group or a salt thereof with an acid, or a quaternary ammonium salt group, and Y is the residue of a polyester chain which together with the —CO— group is derived from a hydroxycarboxylic acid of the formula:

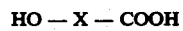

wherein X is a divalent saturated or unsaturated aliphatic radical containing at least 8 carbon atoms and in which there are at least 4 carbon atoms between the hydroxy and carboxylic acid groups, or from a mixture of such hydroxycarboxylic acid and a carboxylic acid which is free from hydroxy groups.

U.K. Pat. No. 131745 describes and claims a composition comprising a dispersion of a solid in an organic liquid containing a polyurea essentially free from basic amino groups which contains at least two urea groups and at least two groups each of which is an alkyl, alkenyl or alkapolyenyl group containing at least 8 carbon atoms, said polyurea being soluble in the organic solvent.

U.K. Application No. 39428/73 describes and claims dispersing agents comprising the adducts of one or more compounds from each of the following classes.

a. an organic compound containing two or more isocyanate groups,
b. an organic compound containing two or more groups which are reactive with isocyanate groups, and
c. an addition polymer containing a hydroxy group.

U.S. Pat. No. 3,741,941 describes and claims a polymeric material of the formula

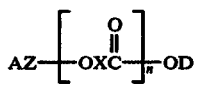

where
A is

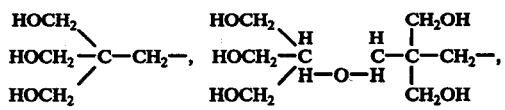

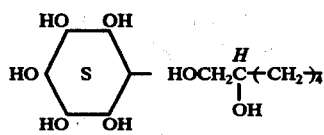

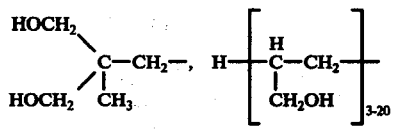

or

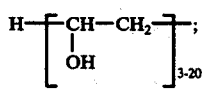

Z is a dicarbamate radical;
X is an alkylene radical of 2 through 18 carbon atoms;
D is hydrogen or an alkyl radical of 1 through 18 carbon atoms; and
n is a number 10 through 500

U.S. Pat. No. 3,788,996 describes and claims a coating composition containing a linear polymeric material represented by the structure:

where
A is

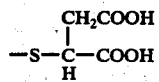

(where n is 1-3)

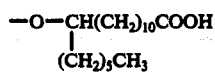

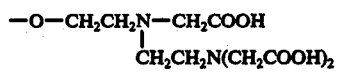

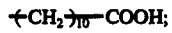

Y is the residue of a di, tri- or tetraisocyanate radical;
X is —S—R—D— where R is alkylene of 1-6 carbon atoms and
D is —O—, —S—

or —NH—;
B is a polymeric segment of an ester of acrylic acid or methacrylic acid with an alkanol of 1-18 carbon atoms; styrene; acrylonitrile; a vinyl ester whose ester moity contains 2-18 carbon atoms; or a vinyl ether; and
m and n are 1, 2 or 3 (the total not exceeding 4); providing that when n is 2 or 3, only one of A need be as defined.

U.S. Pat. No. 3,704,255 describes and claims a polymeric material of the formula

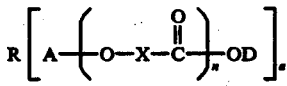

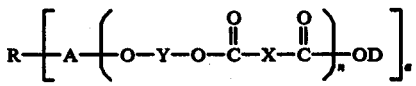

where
R is the residue from a polyhydroxy compound;
A is

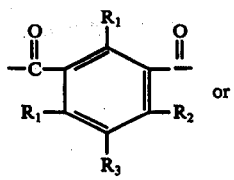

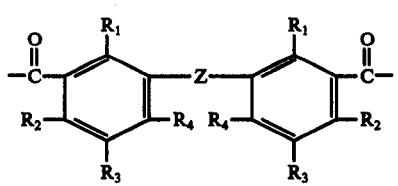

where
$R_1$, $R_2$, $R_3$ and $R_4$ is hydrogen or —COOH;
Z is $$-\overset{O}{\underset{\|}{C}}-$$

$-CH_2-$, $-S-$, $-O-$, or $-SO_2-$;

X is phenylene or an alkylene radical of 2 through 18 carbon atoms;

Y is an alkylene radical of 2 through 18 carbon atoms;

D is phenyl or a straight- or branched chain alkyl radical of 1 through 18 carbon atoms;

$a$ is a number 2 through 6; and $n$ is a number 10 through 500.

U.S. Pat. No. 3,817,944 describes and claims a polymeric material represented by the structure $$\left[ A-\overset{O}{\underset{\|}{C}}-\overset{H}{\underset{|}{N}} \right]_m - Y - \left[ \overset{H}{\underset{|}{N}}-\overset{O}{\underset{\|}{C}}-B \right]_n$$

where

A is a moiety which results from removal of a carboxyl, mercapto, hydroxyl, or amino hydrogen from a polycarboxylic acid, mercaptocarboxylic acid, hydroxycarboxylic acid, or aminocarboxylic acid, respectively, the moiety having a $pk_a$ value of $-1$ to 6;

Y is a moiety which results from the removal of two or more -NCO radicals from a di, tri- or tetraisocyanate radical;

B is a moiety which results from the removal of a hydroxyl hydrogen from a hydroxyl terminated carboxylic acid polyester or copolyester; and $m$ and $n$ are 1, 2 or 3 (the total not exceeding 4), provided that when $m$ is 2 or 3 only one of A need be as defined.

U.S. Pat. No. 3,684,771 describes and claims a polymeric material of the formula:

$$\begin{array}{c} OCN-R-\overset{H}{\underset{|}{N}}-\overset{O}{\underset{\|}{C}} \\ \phantom{OCN-R-N-C}\diagdown \\ \phantom{OCN-R-N-C}N-R-\overset{H}{\underset{|}{N}}-\overset{O}{\underset{\|}{C}}-Q \\ \phantom{OCN-R-N-C}\diagup \\ OCN-R-\overset{|}{\underset{H}{N}}-\overset{\|}{\underset{O}{C}} \end{array}$$

where

R can be alkylene of 2 through 10 carbon atoms, phenylene, tolylene,

[structure: phenylene with S substituents]

$-H_2C-\langle S \rangle-CH_2-$, $\langle S \rangle-CH_2-\langle S \rangle$, $$-CH_2-\underset{\underset{CH_3}{|}}{\overset{\overset{CH_3}{|}}{C}}-CH_2\overset{CH_3}{\underset{|}{C}H}CH_2CH_2-,$$

$\left(CH_2\right)_{\overline{x}} CH-$,
$\phantom{(CH_2)_xx}|$
$\phantom{(CH_2)_xx}C=O$
$\phantom{(CH_2)_xx}|$
$\phantom{(CH_2)_xx}OCH_3$ $\left(CH_2\right)_{\overline{36}}$ $\left(CH_2\right)_{\overline{x}} O\overset{O}{\underset{\|}{C}}-O-\left(CH_2\right)_{\overline{x}}$ $\left(CH_2\right)_{\overline{x}} O\overset{O}{\underset{\|}{C}}-\overset{H}{\underset{|}{C}}=\overset{H}{\underset{|}{C}}-\overset{O}{\underset{\|}{C}}-O\left(CH_2\right)_{\overline{x}}$ Q can be $$\left[O-X-\overset{O}{\underset{\|}{C}}\right]_n OD$$

or $$\left[O-Y-O-\overset{O}{\underset{\|}{C}}-X-\overset{O}{\underset{\|}{C}}\right]_n OD$$

where

D can be alkyl of one through 18 carbon atoms;

X and Y can be phenylene or alkylene of two through 18 carbon atoms; and $n$ is a number 10–500.

U.S. Pat. No. 3,884,713 which is equivalent to German Application No. 2,350,454 describes and claims a flocculation resistant dispersion containing as a stabilizer a material which contains groups soluble in the organic solvent, which contains more than one urethane group and which contains no significant proportion of basic amino groups, wherein said stabiliser is within the range of from 5 to 200% by weight based on the particulate solid in the dispersion and said particulate solids is in the range of from 10 to 60% by weight based on the total weight of the dispersion.

The preferred dispersing agents are however those defined in the claims of U.K. Patent Specification Nos. 1,373,660 and 1,393,401 and in U.K. Patent Application No. 39,428/73.

As examples of the amines and substituted ammonium salts that may be used to form the fluidising agents there may be mentioned tertiary amines and quaternary substituted ammonium salts such as N,N dimethyloctadecylamine, cetyl-trimethylammonium bromide, didodecyldimethylammonium chloride and dioctadecyldimethylammonium chloride.

Alternatively the amines or quaternary ammonium salts may contain polymer chains such as the amines and amine salts described in U.K. Patent Specification No. 1,373,660 especially the polyester amine adducts formed by the reaction between alkylamines and polyhydroxy stearic acid.

The amines and substituted ammonium salts may be cyclised wherein at least two of the organic chains are linked to form a ring containing the nitrogen atom which will form the charge centre of the substituted ammonium ion. The ring or rings so formed may be aliphatic rings such as piperidine or aromatic rings such as pyridine and as examples of such amines or salts there may be mentioned N-cetyl pyridinium salts and N-cetylpiperidine.

One or more of the organic chains attached to the N-atom of the amine or substituted ammonium ion may be substituted by aromatic groups such as phenyl and substituted phenyl radicals which are free from acidic groups e.g. benzyldimethyloctadecylammonium chloride. Alternatively one or more of the organic chains may contain other non acidic substituents such as hydroxy groups e.g. octadecylbis-(2-hydroxyethyl)amine, amino or substituted amino e.g. 3-(N-octadecyl-N-hydroxyethylamino) propyl-N'N'bis(2-hydroxyethyl)amine thus forming polyamines to one of the N-atoms of which is attached at least 3 organic chains containing a total of at least 16 carbon atoms.

As examples of the coloured acids which may be used to form the fluidising agents there may be mentioned copper phthalocyanine monosulphonic acid, copper phthalocyanine disulphonic acids and mixtures of these especially one having an average of about 1.3 sulphonic acid groups per copper phthalocyanine molcule, copper phthalocyanine trisulphonic acid, azo and anthraquinone dyestuffs containing sulphonic acid groups and/or carboxylic acid groups such as the dyestuff formed by coupling tetrazotised benzidine 2-2'disulphonic acid with two molecular proportions of phenyl methylpyrazolone or by coupling carbonyl J Acid with 2 molecular proportions of diazotised 4-aminoazobenzene 3,4'disulphonic acid, sodium-1-amino 4-anilino anthraquinone-2-sulphonate, C.I. Acid Blue 1 (C.I. 42045), C.I. Acid Blue 59 (C.I. 50315) C.I. Acid Blue 90 (C.I. 42655) and C.I. Acid Orange 33 (C.I. 24780).

The above mentioned coloured acids are in no way intended to limit but merely to give examples of the wide range of coloured acids suitable for use in the preparation of the fluidising agents.

As examples of the organic liquid which may be used to form the dispersion of the invention there may be mentioned, esters, such as dialkyl phthalates, alkyd resins and heat bodied linseed oils used as lithographic varnish media, aliphatic alcohols such as ethanol and propanol, ketones such as acetone, methyl ethyl ketone and diethyl ketone, aliphatic hydrocarbons such as petroleum fractions boiling between 60° C and 200° C, white spirit, n-hexane, cyclohexane and mineral oils such as spindle oil and sump oil as used in the preparation of newsprint inks. Preferred organic liquids are however aromatic hydrocarbons such as benzene, xylene, mesitylene and in particular toluene and chlorinated hydrocarbons such as chlorobenzene carbontetrachloride and perchloroethylene.

The invention is illustrated but not limited by the following Examples in which the parts and percentages are by weight:

Agent A

To a slurry of 300 parts of a filter cake containing 85.6 parts of copper phthalocyanine sulphonic acid which contains, on average, 1.3 sulphonic acid groups per copper phthalocyanine nucleus in 3,700 parts of water at 70°-75° C is added 56 parts of triethanolamine followed gradually by 78.6 parts of a commercially available 75% solution in isopropanol of didodecyldimethylammonium chloride (Arquad 2C/75, RTM). When these additions are complete 50 parts of 34% acetic acid is added and the precipitate is filtered off, washed with water and dried. The product is sparingly soluble in toluene.

AGENT B

A mixture of 30 parts of the copper phthalocyanine sulphonic acid filter cake used for Agent A and 200 parts of water is stirred whilst 7.6 parts of a commercially available mixture of 75% of dioctadecyl-dimethylammonium chloride and 25% of isopropanol (Arquad 2HT-75, RTM) is added. After stirring at 90°-100° C for 2 hours the solid is filtered off, washed and dried. It is very sparingly soluble in toluene.

AGENT C

A solution of 100 parts of a commercial quality sodium copper phthalocyanine disulphonate in 2200 parts of water at 75° C is stirred whilst a solution of 95 parts of Arquad 2HT-75 (RTM) in 95 parts of isopropanol and 95 parts of water at 58° C is gradually added. After acidifying with 11.6 parts of concentrated hydrochloric acid, the precipitate is filtered off, washed with water and dried. It is sparingly soluble in tolune.

AGENT D

A solution of 10 parts of commericial quality sodium copper phthalocyanine disulphonate in 220 commercial parts of water at 75° C is precipitated by adding 1 part of acetic acid followed by 20 parts of a 16.4% solution of N,N-dimethyloctadecylamine in 8.2% acetic acid, filtered, washed and dried. It is very sparingly soluble in toluene.

AGENT E

A solution of 50 parts of a commercial quality sodium copper phthalocyanine trisulphonate in 1,200 parts of water at 85° C is stirred whilst 200 parts of a warm (55° C) 7.2% solution of a commercially available cetyltrimethylammonium bromide is added. After acidifying with hydrochloric acid, the solid is filtered off, washed and dried. It is very sparingly soluble in toluene.

AGENT F

A solution of 7 parts of a commercial quality sodium copper phthalocyanine disulphonate in 150 parts of water at 75° c is stirred whilst 44 parts of the solution described below is gradually added. The solid is filtered off, washed with water, then with hot acetone and dried. It is sparingly soluble in toluene.

The solution used above is prepared as follows:

A mixture of 565 parts of commercial quality 12-hydroxystearic acid, 391 parts of stearic acid, 164 parts of 3-dimethylaminopropylamine, 52 parts of toluene and 2 parts of tetrabutyl titanate is stirred unde reflux at 190°-199° C for 12 hours using a trap to remove water and adding a further 30 parts of toluene as required to maintain reflux. After cooling under nitrogen it forms a paste. The acid value is 20.3 mg KOH/g. A solution is prepared by dissolving 10 parts of the paste in 5 parts of acetic acid and 132 parts of isopropanol.

Agent G

A solution of 15 parts of the sodium salt of the urea prepared from phosgene and the aminoazo compounds which is prepared by diazotising p-phenylenediamine and coupling with o-cresotinic acid, in 1,200 parts of water, is stirred at 60° C whilst 200 parts of a warm (55°C) 7.2% solution of a commercial quality cetyltrimethylammonium bromide is added. The solid is filtered off, washed with water and dried. It is very sparingly soluble in toluene.

AGENT H

A solution of 20 parts of commercial quality sodium 1-hydroxy-5,8-bis(2'-benzylcyclohexylamino)anthraquinone disulphonate in 1,250 parts of hot water is precipitated by the addition of 14 parts of a commercially available mixture of 75% of dioctadecyl-dimethylammonium chloride and 25% of isopropanol (Arquad 2HT-75, RTM). After cooling, the tar is isolated, washed with water and dried.

AGENT I

A solution of 15 parts of a filter cake containing 28.5% of copper phthalocyanine sulphonic acid containing on average 1.3 sulphonic acid groups per copper phthalocyanine nucleus in 180 parts of hot water and 1.8 parts of triethanolamine is precipitated by the addition of 2.5 parts of benzyldimethyloctadecylammonium chloride. After acidifying with hydrochloric acid the solid is filtered off, washed and dried.

AGENT J

The cetylpyridinium salt of the same copper phthalocyanine sulphonic acid is prepared similarly.

AGENT K

A solution of 50 parts of commercial quality sodium salt of the dye obtained by coupling one molecular proportion of tetrazotised benzidine-2,2'-disulphonic acid with two molecular proportions of phenylmethylpyrazolone in 4,000 parts of hot water is precipitated by the addition of 40 parts of Arquad 2HT-75 (RTM). After cooling, the sticky solid is isolated, washed with water and dried.

AGENT L

A solution of 50 parts of commercial quality sodium salt of the dye obtained by coupling two molecular proportions of diazotised 4-aminoazobenzene-3,4'-disulphonic acid with one molecular proportion of carbonyl J-acid in 1,500 parts of hot water is precipitated by the addition of 45 parts of Arquad 2HT-75 (RTM). After cooling, the solid is filtered off, washed and dried.

AGENT M

A solution of 5 parts of commercial quality sodium salt of the dye obtained by coupling two molecular proportions of diazotised aniline with one molecular proportion of carbonyl J-acid in 400 parts of hot water is precipitated with "Arquad 2HT", filtered, washed and dried.

AGENT N

A solution of 5 parts of commercial quality sodium 1-amino-4-anilinoanthraquinone-2-sulphonate in 100 parts of hot water is precipitated with "Arquad 2HT". The sticky solid is isolated, washed and dried.

AGENT O

A solution of 5 parts of C.I. Acid Blue 1 (C.I. 42045) in 100 parts of hot water is precipitated with "Arquad 2HT". The solid is filtered off, washed and dried.

AGENT P

A solution of 5 parts of C.I. Acid Blue 90 (C.I. 42455) in 100 parts of hot water is precipitated with "Arquad 2HT". The sticky solid is isolated, washed and dried.

AGENT Q

A solution of 5 parts of C.I. Acid Blue 59 (C.I. 50315) in 100 parts of hot water is precipitated with "Arquad 2HT". The solid is filtered off, washed and dried.

AGENT R

A solution of 5 parts of C.I. Acid Orange 33 (C.I. 24780) in 100 parts of hot water is precipitated with "Arquad 2HT". The solid is filtered off, washed and dried.

AGENT S

A suspension of 22 parts of a filter cake containing 28.4% of copper phthalocyanine sulphonic acid containing on average 1.3 sulphonic acid groups per copper phthalocyanine nucleus in 50 parts of water is stirred whilst a solution of 2.64 parts of Ethomeen T/12 (RTM, commercial quality octadecyl-bis(2-hydroxyethyl)amine) in 7.6 parts of 6% acetic acid and 10 parts of water is added. After stirring for 3 hours at 90°–100° C. the solid is filtered off, washed and dried.

AGENT T

This is prepared as described for Agent S except that instead of the "Ethomeen T/12" solution there are added 7.5 parts of a solution prepared by refluxing for 2 hours a mixture of 18.8 parts of "Ethomeen T/12", 27.6 parts of acetone and 6.76 parts of dimethyl sulphate.

AGENT U

This is prepared as described for Agent S except that instead of the "Ethomeen T/12" solution there are added 5.7 parts of a solution prepared by refluxing for 2 hours a mixture of 28.6 parts of Ethoduomeen t/13 (RTM, an adduct from commercial quality 3-octadecylaminopropylamine and three molecular proportions of ethylene oxide), 39.5 parts of acetone and 13.52 parts of dimethyl sulphate.

EXAMPLE 1

A mixture of 1.22 parts of a 49.2% solution in a petroleum fraction boiling at 100° to 120° C of Agent I of U.K. Patent Specification No. 1,393,401, 0.3 part of Agent A as described herein, 5.48 parts of toluene and 3 parts of β-form copper phthalocyanine is ball milled for 16 hours to give a fluid dispersion of the pigment which is suitable for use in a gravure printing ink. When Agent A is omitted a thick dispersion is obtained.

EXAMPLE 2

A mixture of 1.22 parts of a 49.2% solution in a petroleum fraction boiling at 100° C to 120° C of Agent I of U.K. Patent Specification No. 1,393,401, 0.3 part of Agent C as described herein, 5.48 parts of toluene and 3 parts of β-form copper phthalocyanine is ball milled for 16 hours to give a fluid dispersion of the pigment which is suitable for use in a gravure printing ink.

A fluid dispersion is also obtained when Agent C is replaced by the copper phthalocyanine disulphonate from "Arquad S" but not when Agent C is replaced by the copper phthalocyanine disulphonates from "Arquad 12", dodecylamine, octadecylamine, tributylamine or t-octylamine.

Arquad S and Arquad 12 (registered trade marks) are quaternary ammonium chlorides of structure $RN^+(CH_3)_3 C^-$. In the case of "Arquad S", the group R is largely octadecenyl and octadecadienyl. In the case of "Arquad 12", the group R is mostly dodecyl.

The following table (Table I) gives further examples of fluid dispersions of the invention which are obtained by milling together the pigment and the number of parts thereof listed in Column 2 of the table, the agents and number of parts thereof listed in columns 3 and 4 of the table and sufficient of the organic liquids listed in column 5 of the table to bring the total weight to 10 parts.

| Ex. | Pigment and amount thereof | Dispersing Agent and amount thereof | Fluidising Agent and amount thereof | Organic Liquid |
|---|---|---|---|---|
| 3 | 3 parts of β-form copper phthalocyanine | 1.22 parts of the 49.2% solution described in Example 1. | 0.3 parts of Agent I | toluene |
| 4 | " | " | Agent B | " |
| 5 | " | " | Agent D | " |
| 6 | " | " | Agent E | " |
| 7 | " | " | Agent F | |
| 8 | 2.5 parts of β-form copper phthalocyanine | " | Agent B | perchloro-ethylene |
| 9 | " | " | " | butyl acetate |
| 10 | " | " | " | methyl isobutyl ketone |
| 11 | " | " | " | 2-ethyl-hexanol |
| 12 | 3 parts of Tioxide RCR, a coated form of rutile titanium dioxide | " | " | toluene |
| 13 | 3 parts of an aluminum lake of 1,4-dihydroxy-anthraquinone sulphonic acid | " | " | " |
| 14 | 3 parts of the phosphomolybdot-ungstate of C.I. Basic Blue 7 42595 | " | " | " |
| 15 | copper polychloro-phthalocyanine | " | " | " |
| 16 | carbon black | " | " | " |
| 17 | 3 parts of a nickel toner of 3-(4'-chloro-phenylazo)quinoline-2,4-diol | " | " | " |
| 18 | 2 parts of flavan-throne | 0.81 parts of the 49.2% solution described in Example I | 0.2 part Agent G | xylene |
| 19 | 2 parts of indanthrone | " | 0.2 part Agent B | " |
| 20 | 3 parts of β-form copper phthalo-cyanine | 0.8 part of the 37.7% solution described in Example 6 in U.K. Patent Specification No. 1393402 | 0.3 part of Agent B | toluene |
| 21 | " | 0.6 part of the product described in Example 2 of U.K. Specification No. 1373660 | " | " |
| 22 | " | " | 0.3 parts of Agent S | " |
| 23 | " | " | 0.3 part of Agent T | " |
| 24 | " | " | 0.3 part of Agent U | " |
| 25 | " | 0.3 part of the product of Example 1 of U.K. Patent Specification No. 1373660 | 0.3 Part of Agent B | " |
| 26 | " | 1.5 parts of a 40% solution in white spirit of a polyurea made by the method of Example 10 of U.K. Patent Specific-cation No. 1313745 but using 20.3 parts | " | " |

-continued

| Ex. | Pigment and amount thereof | Dispersing Agent and amount thereof | Fluidising Agent and amount thereof | Organic Liquid |
|---|---|---|---|---|
| | | of 'Armeen 2S' and 29.8 parts of 'Duomeen T' in 81.5 parts of white spirit and 17.4 parts of toluene diisocyanate in 19.2 parts of white spirit | | |
| 27 | " | 0.6 parts of the dispersing agent described in Example 4 of German Patent Application No. 2350454 | " | " |
| 28 | " | 1.28 parts of a 46.9 solution in a petroleum fraction boiling at 100° C to 120° C of the dispersing agent described in Example 1 of British Application 39428/73 | " | " |
| 29 | 3 parts of indanthrone | 1.22 parts of the 49.2% solution described in Example 1 | 0.3 part of Agent H | " |
| 30 | 3 parts of β-form copper phthalocyanine | " | 0.3 part of Agent J | " |
| 31 | 2 parts of C.I. Pigment Yellow No. 12 (C.I. 21090) | 0.81 part of the 49.2% solution described in Example 1 | 0.2 part of Agent K | " |
| 32 | 2 parts of C.I. Pigment Yellow No. 13 (C.I. 21100) | " | " | " |
| 33 | 2 parts of 4,10-dibromoanthanthrone | 0.81 part of the 49.2% solution described in Example 1 | 0.2 part of Agent L | " |
| 34 | " | " | 0.2 part of Agent M | " |
| 35 | 2 parts of indanthrone | " | 0.2 part of Agent N | " |
| 36 | " | " | 0.2 part of Agent O | " |
| 37 | " | " | 0.2 part of Agent P | " |
| 38 | " | " | 0.2 part of Agent Q | " |
| 39 | 2 parts of 4,10-dibromoanthanthrone | " | 0.2 part of Agent R | " |

EXAMPLE 40

A mixture of 10.7 parts of C.I. Pigment Yellow No. 3, 19.7 parts of a 20% solution of a long oil air drying alkyd resin in white spirit and 0.214 part of Agent G is ball milled to give a fluid dispersion of the pigment which on dilution with alkyd resin solution and driers gives a paint with improved tinctorial strength and gloss.

A similar result is obtained using Agent K instead of Agent G.

EXAMPLE 41

A mixture of 64 parts of crude β-form copper phthalocyanine, 32.5 parts of a 49.2% solution in a petroleum fraction boiling at 100° C to 120° C of Agent I of U.K Patent Specification No. 1,393,401, 6.4 parts of Agent B and 97.1 parts of a petroleum fraction boiling between 100° and 120° C is ball milled for 216 hours. The product is a fluid deflocculated dispersion containing essentially no particles of greater than 3 microns, the majority being less than 1 micron.

This dispersion is suitable for use in gravure printing inks and shows increased strength compared with conventional dispersions of β-form copper phthalocyanine.

EXAMPLE 42

A mixture of 45 parts of carbon black pigment (commercially available as Regal 300, RTM), 65 parts of spindle oil, 4.45 parts of a 48% solution in spindle oil of Agent I of U.K. Patent Specification No. 1,393,401 and 0.55 part of Agent C is passed over a three roll mill until the pigment is well dispersed. A further 185 parts of spindle oil are intimately mixed into the dispersion to give a fluid composition suitable for printing newspaper by the letterpress process.

EXAMPLE 43

A mixture of 15 parts of carbon black pigment (commercially available as Regal 300, RTM), 83.5 parts of spindle oil, 1.333 parts of a 48% solution in spindle oil of Agent I of U.K. Patent Specification No. 1,393,401 and 0.167 part of Agent C is ball milled for 16 hours to give a fluid dispersion suitable for printing newspaper by the letterpress process.

EXAMPLE 44

A mixture of 80 parts of methylated 1,5-diamino-4,8-dihydroxyanthraquinone, 32 parts of a 50% solution in a petroleum fraction boiling at 100° to 120° C of Agent I of U.K. Patent Specification No. 1,393,401, 4 parts of Agent B as described herein and 84 parts of a toluene is gravel milled for 16 hours. The mixture is then diluted with 120 parts of toluene and discharged to give a fluid dispersion containing no particles above 3 $\mu$, the majority being less than 1 $\mu$. This dispersion is suitable for use in gravure and rotary screen printing inks particularly for printing paper to give transfer papers suitable for application to polyester textile materials by the transfer printing process.

The following table (Table 2) gives further examples of compositions of the invention, where the presence of the fluidising agent as defined herein improves the fluidity of the dispersion, which are obtained by milling together the pigment and number of parts thereof listed in Column 2 of the table, the agents and number of parts thereof listed in columns 3 and 4 of the table and sufficient of the organic liquids listed in column 5 of the table to bring the total weight to 10 parts.

TABLE 2

| Ex. | Pigment and Amount thereof | | Fluidising Agent and amount thereof | Organic Liquid |
|---|---|---|---|---|
| 45 | 2 parts of β-form copper phthalocyanine | 1.2 parts of a 50% solution in isopropyl acetate of a copolymer of 90 parts isobutyl methacrylate. | Agent B (0.3 parts) | Toluene |
| 46 | " | 1.5 parts of a 40% solution in xylene of a copolymer of 9 parts n-butyl methacrylate and 1 part methacrylic acid. | " | " |
| 47 | " | 1.0 part of a 60% solution in xylene of an alkyd resin containing 33.5% coconut oil fatty acids, 43% phthalic anhydride, known as 'Soalkyld 4492' (RTM) and marketed by Soab Ltd. | " | " |
| 48 | " | 1.2 parts of a 50% solution in xylene of an alkyd resin containing 38% hydrogenated castor oil fatty acids, 40% phthalic anhydride and trimethylolpropane as 'Beckosol 3020' (RTM) and marketed by Synthetic Resins Ltd. | " | " |
| 49 | " | 0.6 part of castor oil citrate | " | " |
| 50 | " | 1.2 parts of a 50% solution in xylene of a chain-stopped alkyd resin containing 25% of non-yellowing fatty acids, 44% phthalic anhydride, and pentaerythritol, known as 'Beckosol 12-101' (RTM) and marketed by Synthetic Resins Ltd. | " | " |
| 51 | " | 1.0 part of a 60% solution in xylene of an alkyd resin containing 52% linseed oil fatty acids, 32% phthalic anhydride and glycerol. | " | " |
| 52 | " | 0.6 part of an alkyd resin containing 68% linseed oil fatty acids, 20% phthalic anhydride and pentaerythritol | " | " |
| 53 | " | 0.82 part of a 73.6% solution in xylene of a polyester resin being the reaction product of 2.0 parts pentaerythritol, 37.9 parts phthalic anhydride and 60.1 parts of 'Cardura E' (RTM) marketed by Shell Chemicals Ltd. | " | " |
| 54 | " | 1.2 parts of a 50% solution in a high boiling aromatic solvent of a modified polyester resin containing castor oil, known as 'Amerlac 292 G' (RTM) and marketed by Rohm and Haas Company. | " | " |
| 55 | " | 1.1 parts of a 55% solution in white spirit of a urethane alkyd containing non-yellowing oils, known as 'Hythane 5W' (RTM) and marketed by Croda Resins Ltd. | " | " |
| 56 | " | 1.0 part of a 60% solution in white spirit of a urethane oil containing linseed oil, known as 'Beckurane 77/60' (RTM) and marketed by Synthetic Resins Ltd. | " | " |
| 57 | " | 1.28 parts of a solution in 'Aromasol H' (RTM), a high boiling aromatic solvent marketed by ICI Ltd., of a poly n-butyl methacrylate. | " | " |
| 58 | " | 1.2 parts of a solution in isopropanol of a copolymer of 25 parts diacetone acrylamide, 50 parts methyl methacrylate and 25 parts 2-ethylhexyl methacrylate. | " | " |
| 59 | " | 1.0 part of a 60% solution in isopropyl acetate of a copolymer of 42 parts methyl methacrylate, 40 parts 2-ethylhexyl methacrylate and 18 parts hydroxy alkyl methacrylate. | " | " |
| 60 | " | 1.2 parts of a 50% solution in xylene of an epoxy ester containing 40% dehydrated castor oil fatty acids, known as 'Plastokyd E-D4X (RTM) and marketed by Croda Resins Ltd. | " | " |
| 61 | " | 0.6 part of an oxypropylated glycerol of molecular weight 312 | " | " |
| 62 | " | 0.6 part of an oxypropylated triethanolamine of molecular weight 321 | " | " |
| 63 | " | 0.6 part of a polyester resin being the reaction product of 51.5 parts adipic acid, 33.3 parts 1,3-butylene glycol and 15.6 parts hexane triol. | " | " |
| 64 | " | 0.6 part of a linear polyether of molecular weight 1500 being the reaction product of iso octanol with a mixture of equal parts by weight of ethylene oxide and propylene oxide. | " | " |
| 65 | " | 1.2 parts of a 50% solution in toluene of a gum resin known as Portugese Y Grade | " | " |
| 66 | " | 1.2 parts of a 50% solution in toluene of a hydro- | " | " |

TABLE 2-continued

| Ex. | Pigment and Amount thereof | | Fluidising Agent and amount thereof | Organic Liquid |
|---|---|---|---|---|
| 67 | " | carbon resin produced by polymerising an unsaturated C₅ hydrocarbon fraction<br>1.2 parts of a 50% solution in toluene of a hydrocarbon resin produced by polymerising an unsaturated C₅ hydrocarbon fraction, modified by further reaction with maleic anhydride. | " | " |
| 68 | " | 1.2 parts of a 50% solution in toluene of an ester gum containing resin and glycerol as 'Beckacite 1202' (RTM) and marketed by Synthetic Resins Ltd. | " | " |
| 69 | " | 1.2 parts of a 50% solution in toluene of a cyclic ketone synthetic resin, known as 'Resin MS2' (RTM) and marketed by Laporte Industries Ltd. | " | " |
| 70 | " | 1.2 parts of a 50% solution in toluene of an unmodified oil soluble phenol-formaldehyde resin | " | " |
| 71 | " | 1.2 parts of a 50% solution in toluene of a rosin modified phenol-formaldehyde resin, known as 'Mitchanol 37' (RTM) and marketed by W.A. Mitchell and Smith Ltd. | " | " |
| 72 | " | 0.6 parts of a liquid polybutadiene resin known as 'Poly bd R-45M' (RTM) marketed by ARCO Chemical Company, a division of Atlantic Richfield Company. | " | " |
| 73 | " | 0.6 part of a linear polycaprolactone of molecular weight 2,000, known as 'CAPA 420' (RTM) and marketed by Interox Chemicals Ltd. | " | " |
| 74 | " | 0.6 part of a linear polycaprolactone of molecular weight 550, known as 'CAPA 200' (RTM) marketed by Interox Chemicals Ltd. | " | " |
| 75 | " | 1.8 parts of a 33% solution in toluene of ethyl cellulose, grade N7 as marketed by Hercules Powder Comany Limited. | " | " |
| 76 | " | 2.4 parts of a 25% solution in equal parts by weight of toluene and n-butanol of a polyamide resin known as 'Eurelon 934' (RTM) by Schering Chemicals Ltd. | " | " |
| 77 | " | 2.4 parts of a 25% solution in a mixture of 2 parts by weight of toluene to 1 part by weight of a diphenylol propane based epoxy resin known as 'Epikote 1004' (RTM) marketed by Shell Chemical Co. | " | " |
| 78 | " | 1.8 parts of a 33% solution in toluene of a chlorinated rubber having a typical molecular weight of 25,000 and a viscosity as a 20% solution in toluene of between 4 and 6 centipoises at 25° C. | " | " |
| 79 | " | 0.6 part of the reaction product of 1 mole of nonyl phenol with 8 moles of ethylene oxide | " | " |
| 80 | " | 0.6 part of O,O-diethyl-N,N-bis(2 hydroxy ethyl) aminomethyl phosphanate, otherwise known as 'Fyrol 6' (RTM) marketed by Stauffer Chemical Co. | " | " |
| 81 | " | 0.6 part of a block copolymer comprising 90 parts by weight of propylene oxide, 10 parts by weight ethylene oxide and having a molecular weight of 1940, known as 'Pluronic L61' (RTM) marketed by Wyandotte Chemical Corporation | " | " |
| 82 | " | 1.8 parts of a 33% solution in a mixture of equal parts by weight of toluene and n-butanol of a polyamide resin known as 'Eurilon XE 836' (RTM) marketed by Schering Chemicals Ltd. | " | " |
| 83 | " | 0.6 part of methyl rosinate known as 'Bergol A' (RTM) marketed by Sheby | " | " |
| 84 | " | 0.6 part of an oxypropylated glycerol of molecular weight 3000 | " | " |
| 85 | " | 0.6 part of a siloxane oxyalkylene copolymer known as 'Silicone L3240' (RTM) marketed by Union Carbide Corporation | " | " |
| 86 | " | 2.3 parts of a 26% solution in ethyl acetate of a nitro cellulose having a nitrogen content in the range 11.7 – 12.2% by weight, viscosity of between 30 and 50 poises when measured as a solution of 40 g of dry material in 100 ml of 95% acetone | " | Ethyl Acetate |
| 87 | " | 2.7 parts of a 22% solution in ethyl glycol acetate of a 1/10th second cellulose acetate butyrate as marketed by Eastman Chemical International | " | Ethyl Glycol Acetate |
| 88 | " | 1.8 parts of a 33% solution in methyl isobutyl ketone of partly hydrolysed vinyl acetate/vinyl chloride copolymer known as 'Vinylite VROH' (RTM) marketed by Union Carbide Europa S.A. | " | Methyl-Isobutyl Ketone |
| 89 | " | 1.8 parts of a 33% solution in tetrahydrofuran of a copolymer of vinylidene chloride, acrylonitrile and methyl methacrylate | " | Tetra hydro furan |
| 90 | " | 1.8 parts of a 33% solution in 74 OP methylated spirits of polyvinyl pyrrolidone, grade K30 as marketed by General Aniline and Film Corporation | " | 74 OP methylated spirits |
| 91 | " | 2.4 parts of a 25% solution in methyl chloroform (1:1:1-Trichloro ethane) of an isomerised rubber known as 'Surcoprene 1000' (RTM) marketed by Warsdall Chemical Co. Ltd. | " | 1,1,1-Tri-chloro ethane |
| 92 | 3 parts of β-form copper | 1.2 parts of a 50% solution in toluene of a polyester material, the manufacture of which is | " | toluene |

TABLE 2-continued

| Ex. | Pigment and Amount thereof | | Fluidising Agent and amount thereof | Organic Liquid |
|---|---|---|---|---|
| | phthalocyanine | described in Example 1 of United States Patent No. 3,741,941 | | |
| 93 | " | 0.6 part of a polyester material corresponding to Example 3 of United States Patent No. 3,741,941 | " | " |
| 94 | " | 1.3 parts of a 48% solution in a solvent comprising of a mixture of toluene, xylene and ethyl glycol acetate, of a polymeric material corresponding to Example 1 of United States Patent No. 3,788,996 | " | " |
| 95 | " | 0.77 part of a 78% solution in a mixture of toluene xylene and ethyl glycol acetate of a polymeric material corresponding to Example 15 of United States Patent No. 3788996 | " | " |
| 96 | " | 1.2 parts of a 50% solution in toluene of a polyester corresponding to Example 2 of United States Patent No. 3,704,255 | " | " |
| 97 | " | 1.2 parts of a 50% solution in toluene of a polyester corresponding to Example 3 of United States Patent No. 3,704,255 | " | " |
| 98 | " | 1.0 part of a 58% solution in a mixture of toluene, xylene and alkyl glycol acetate of a polyester corresponding to Example 1 of United States Patent No. 3,817,944 | " | " |
| 99 | " | 1.2 parts of a 50% solution in toluene of polyester corresponding to Example 2 of United States Patent No. 3,817,944 | " | " |
| 100 | " | 1.2 parts of a 50% solution in toluene of a polyester corresponding to Example 1 of United States Patent No. 3,684,771 | " | " |
| 101 | " | 1.2 parts of a 50% solution in toluene of a polyester corresponding to Example 3 of United States Patent No. 3,684,771 | " | " |
| 102 | " | 1.2 parts of a 50% solution in toluene of a polyester corresponding to Example 6 of United States Patent No. 3,684,771 | " | " |
| 103 | " | 1.2 parts of a 50% solution in toluene of a polyester corresponding to Example 8 of United States Patent No. 3,684,771 | " | " |
| 104 | " | 1.2 parts of a 50% solution of a polyester corresponding to Example 2 of United States Patent No. 3,741,941 | " | " |
| 105 | " | 1.3 parts of a 48% solution in a mixture of methyl ethyl ketone xylene and ethyl glycol acetate of the product of Example 7 of USP 3788996 | " | " |

We claim:

1. A composition comprising a dispersion of from 5% to 70% by weight based on the total weight of the dispersion of a pigment or dyestuff with an average particle size of less than 20 microns in an organic liquid containing dissolved therein from 5% to 100% by weight based on the weight of the pigment or dyestuff of a polymeric or resinous dispersing agent in which the improvement comprises the presence in the dispersion of from 1% to 50% by weight based on the weight of the pigment or dyestuff of a fluidising agent which is a quaternary ammonium salt of a monomeric coloured acid wherein there are from 19 and up to 60 carbon atoms contained in the 4 chains attached to the N-atom of the quaternary ammonium ion.

2. A composition according to claim 1 in which there are between 25 and 40 carbon atoms in the quaternary ammonium ion.

3. A composition according to claim 1 in which the coloured acid is a phthalocyanine containing a —COOH or —SO$_3$H group.

* * * * *